Aug. 25, 1936.  A. B. WELTY  2,052,328
BEATER FOR THRESHERS AND THE LIKE
Filed Oct. 18, 1934
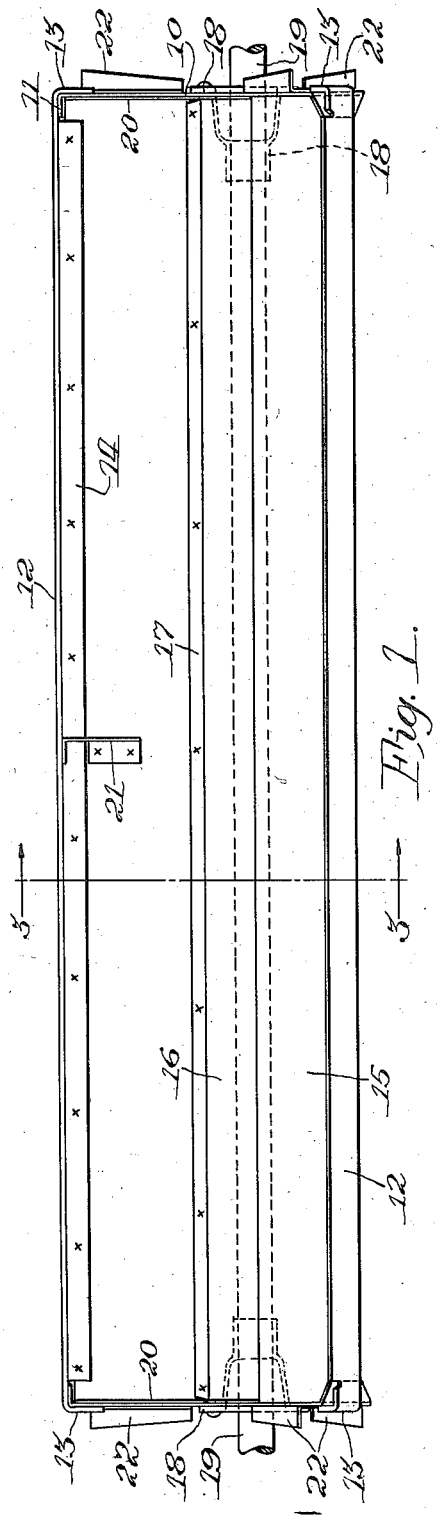
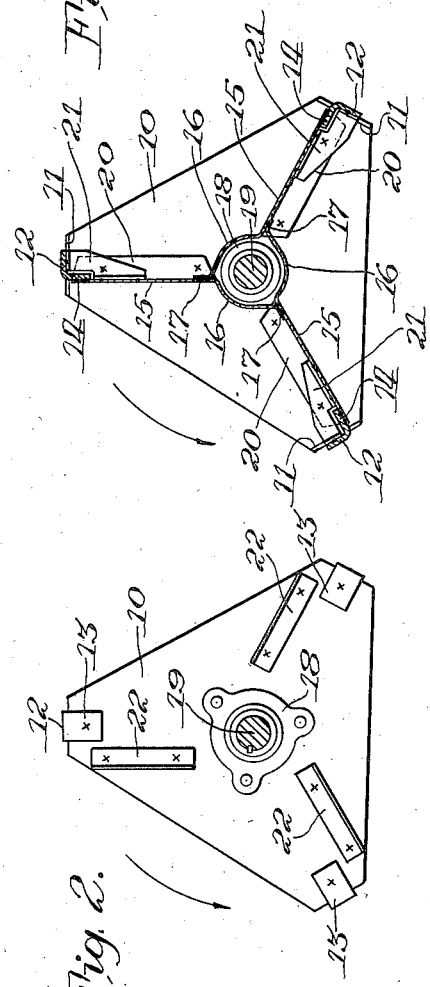
Inventor
Albert B. Welty Patented Aug. 25, 1936

2,052,328

UNITED STATES PATENT OFFICE 2,052,328

BEATER FOR THRESHERS AND THE LIKE

Albert B. Welty, Moline, Ill., assignor to International Harvester Company, a corporation of New Jersey Application October 18, 1934, Serial No. 748,780

3 Claims. (Cl. 130—23)

The invention relates to an improved beater formed of sheet metal and adapted for use in threshing machines to take the straw from the threshing cylinder and beat it down onto conveyer mechanism, or the like, to insure proper straw movement to the so-called raddle, or straw walker element of the separator.

Considerable difficulty is encountered in the use of conventional beaters of this type because of straw winding therearound and interfering with the proper functioning thereof.

Accordingly, the main object of this invention is to provide an improved beater construction in which no straw catching and winding projections are present.

Another object is to provide a light weight, all metal, built up beater structure in which the parts are securely interbraced and welded together to form a unitary device.

Other important objects will be apparent as the disclosure is completed.

Such objects may be achieved by providing the structurally built-up and welded beater shown in the accompanying sheet of drawing, wherein:

Figure 1 is a general elevational view of the improved beater;

Figure 2 is an end view thereof; and,

Figure 3 is a cross sectional view through the beater taken along the line 3—3 of Figure 1, looking in the direction indicated by the arrows.

In constructing this novel beater, in its preferred form, two triangularly shaped end plates 10 are provided, said plates being substantially equi-lateral and cut off at their angles where they are provided with in-turned, lateral flanges 11, as shown. These end plates 10 are arranged in proper spaced relation and are connected by three angle bar pieces 12 welded to the flanges 11 heretofore described, in the manner shown. The pieces 12 have their ends turned radially inwardly, as shown at 13, said ends being welded to the outer faces of the end plates 10. This structure securely connects and interbraces the two end plates and forms the skeleton or frame for the beater.

The angle bar pieces 12 each include a radially inwardly extending flange 14, to each of which is welded the outer edge of a plate 15 forming a radially inwardly extending paddle or beater member. Each paddle or beater member extends radially toward the beater axis and is bent in a curve 16 and a flange 17 which is welded to the adjacent member 15, as shown in Figure 3, to form a continuous hollow or tubular axial portion from one end of the beater to the other. Thus, in the form of the beater herein shown, the three paddle or beater members 15 are connected together at their inner ends to form a tubular portion, as shown, which portion at each end of the beater is adapted to have inserted thereinto the collars 18 for journaling the beater on a drive shaft shown at 19.

The ends of each beater member 15 are bent at an angle to form end flanges 20, which are spot welded to the adjacent inner faces of the end plates 10, thus serving further to strengthen and unify the structure. Midway between the ends of the beater the same is further stiffened by providing three brackets 21 having portions welded respectively to the adjacent pieces 12 and beater members 15 in the manner shown.

On the outer faces of each end plate 10 are welded thereto three short angle bar pieces 22, which are disposed tangentially relative to the tubular portion surrounding the drive shaft 19, as shown in Figure 2. Further, the laterally protruded flange of each piece 22 is tapered, or inclined, so that the inner end thereof is of shallow depth, whereas the outer end is of greater depth. These pieces, or vanes, 22 are adapted to turn with the beater and occupy the space between the beater end plates and the walls (not shown) of the separator in which the shaft 19 is mounted to keep said space clear of straws and to prevent them from winding about the shaft.

The preferred form of the beater herein disclosed comprises three beater paddles and triangularly shaped end pieces. Obviously the beater may assume other forms; for instance square end plates and four beater members could be employed if desired.

The direction of rotation of the beater in use is counterclockwise, as indicated by the arrow in Figure 2. The unitary structure of the beater produced by spot welding the parts thereof together results in a smooth beater presenting no sharp corners or projections in which straw could accumulate or wind to foul the beater as it rotates, and impede its efficient running.

It is the intention to cover herein all such changes and modifications not departing from the scope of the invention as defined in the appended claims.

What is claimed is:

1. A sheet metal beater structure comprising a pair of triangularly shaped end plates having inturned flanges, cross members having bent ends lying over the outer faces of the end plates and welded to the flanges and end plates, said cross members having inwardly extending flanges, and beater members arranged radially and having their outer edges welded to the flanges on the cross members and their inner edges joined together by welding to form an axial hollow portion, said beater members having bent end portions welded to the inner faces of said end plates.

2. A beater structure comprising beater members associated with a pair of end plates, said structure having an axial shaft mount portion, and means associated with the outer faces of the end plates to prevent winding of material, said means comprising laterally projecting vanes having a tapered edge with their greatest depth near the periphery of the beater and their least depth adjacent the axial portion.

3. A beater structure comprising beater members associated with a pair of end plates, said structure having an axial shaft mount portion, and means associated with the outer faces of the end plates to prevent winding of material, said means comprising laterally projecting vanes having a tapered edge with their greatest depth near the periphery of the beater and their least depth adjacent the axial portion, said vanes being disposed tangent to the said axial portion.

ALBERT B. WELTY.